United States Patent
Ohyama

(10) Patent No.: US 11,454,812 B2
(45) Date of Patent: Sep. 27, 2022

(54) VIRTUAL IMAGE DISPLAY DEVICE

(71) Applicant: JVCKENWOOD Corporation, Yokohama (JP)

(72) Inventor: Minoru Ohyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/336,782

(22) Filed: Jun. 2, 2021

(65) Prior Publication Data
US 2021/0286174 A1 Sep. 16, 2021

Related U.S. Application Data

(63) Continuation of application No. PCT/JP2019/045575, filed on Nov. 21, 2019.

(30) Foreign Application Priority Data

Mar. 26, 2019 (JP) .............................. JP2019-057824

(51) Int. Cl.
*G02B 27/00* (2006.01)
*B60K 35/00* (2006.01)
(Continued)

(52) U.S. Cl.
CPC .......... *G02B 27/0093* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS

| 2013/0044138 A1* | 2/2013 | Koga | B60K 35/00 345/672 |
| 2016/0147062 A1* | 5/2016 | Yamakawa | H04N 3/08 348/203 |

(Continued)

FOREIGN PATENT DOCUMENTS

JP 2013-057897 A1 3/2013

OTHER PUBLICATIONS

International Search Report from International Search Report mailed PCT/JP2019/045575 dated Dec. 24, 2019, 3 pages.

*Primary Examiner* — Christopher R Lamb
(74) *Attorney, Agent, or Firm* — Brundidge & Stanger, P.C.

(57) ABSTRACT

A virtual image display device includes: an image projection unit that selectively projects a first projection light linearly polarized in a first direction and a second projection light linearly polarized in a second direction orthogonal to the first direction to a windshield; a reflected light measurement unit that measures an intensity of light incident from the windshield into the image projection unit along a light path in which the first projection light and the second projection light are projected; and a determination unit that determine whether a user is wearing polarized sunglasses that shield a component linearly polarized in the first direction, based on a first light intensity measured by the reflected light measurement unit when the first projection light is projected and a second light intensity measured by the reflected light measurement unit when the second projection light is projected.

7 Claims, 5 Drawing Sheets

(51) Int. Cl.
*G02B 27/01* (2006.01)
*G02B 27/28* (2006.01)
*G06V 40/16* (2022.01)

(52) U.S. Cl.
CPC ......... *G02B 27/286* (2013.01); *G06V 40/171* (2022.01); *B60K 2370/1529* (2019.05); *B60K 2370/741* (2019.05); *G02B 2027/014* (2013.01); *G02B 2027/0138* (2013.01)

(56) References Cited

U.S. PATENT DOCUMENTS

2016/0349507 A1* 12/2016 Hayashi ................. G02B 27/01
2018/0341109 A1* 11/2018 Lin ......................... G02B 27/01
2018/0357505 A1* 12/2018 Weindorf ............. G02B 5/3058

* cited by examiner

VIRTUAL IMAGE DISPLAY DEVICE

CROSS REFERENCE TO RELATED APPLICATION

Priority is claimed to Japanese Patent Application No. 2019-057824, filed on Mar. 26, 2019, the entire contents of which are incorporated herein by reference.

BACKGROUND

1. Field of the Invention

The present invention relates to a virtual image display device.

2. Description of the Related Art

Recently, head-up displays, configured to project an image display light onto a windshield of a vehicle, etc., and display an image by superimposing the virtual image based on the image display light on the scenery outside the vehicle, are used. The user (e.g., the driver) views the image display light reflected on the windshield. It is known that the reflectance of a common windshield made of glass, etc. has polarization dependency, and the p-polarized component is less easily reflected than the s-polarized component. When the user is wearing polarized sunglasses, the s-polarized component that is easily reflected by the windshield is shielded by the polarized sunglasses, which makes it difficult to view the image display light. Display devices configured to make it easy to view the image display light even when polarized sunglasses are being worn are proposed (see, for example, Patent Literature 1).

[Patent Literature 1] JP2013-57897

When the p-polarized component that is not easily reflected by the windshield is mainly used, the image display light will look dark to the user not wearing polarized sunglasses. It is preferable to provide a suitable image display light depending on whether polarized sunglasses are being worn.

SUMMARY

The present invention addresses the above issue and a purpose thereof is to provide a technology for switching the image display light depending on whether polarized sunglasses are being worn.

A virtual image display device according to an embodiment of the present invention includes: an image projection unit that selectively projects a first projection light linearly polarized in a first direction and a second projection light linearly polarized in a second direction orthogonal to the first direction to a windshield and that presents to a user a virtual image based on the first projection light or the second projection light reflected by the windshield; a reflected light measurement unit that measures an intensity of light incident from the windshield into the image projection unit along a light path in which the first projection light and the second projection light are projected; a determination unit that determine whether the user is wearing polarized sunglasses that shield a component linearly polarized in the first direction, based on a first light intensity measured by the reflected light measurement unit when the first projection light is projected and a second light intensity measured by the reflected light measurement unit when the second projection light is projected; and a display control unit that causes the image projection unit to project the first projection light when the determination unit determines that polarized sunglasses are not being worn and causes the image projection unit to project the second projection light when the determination unit determines that polarized sunglasses are being worn.

Optional combinations of the aforementioned constituting elements, and mutual substitution of constituting elements and implementations between methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

Figure 1:
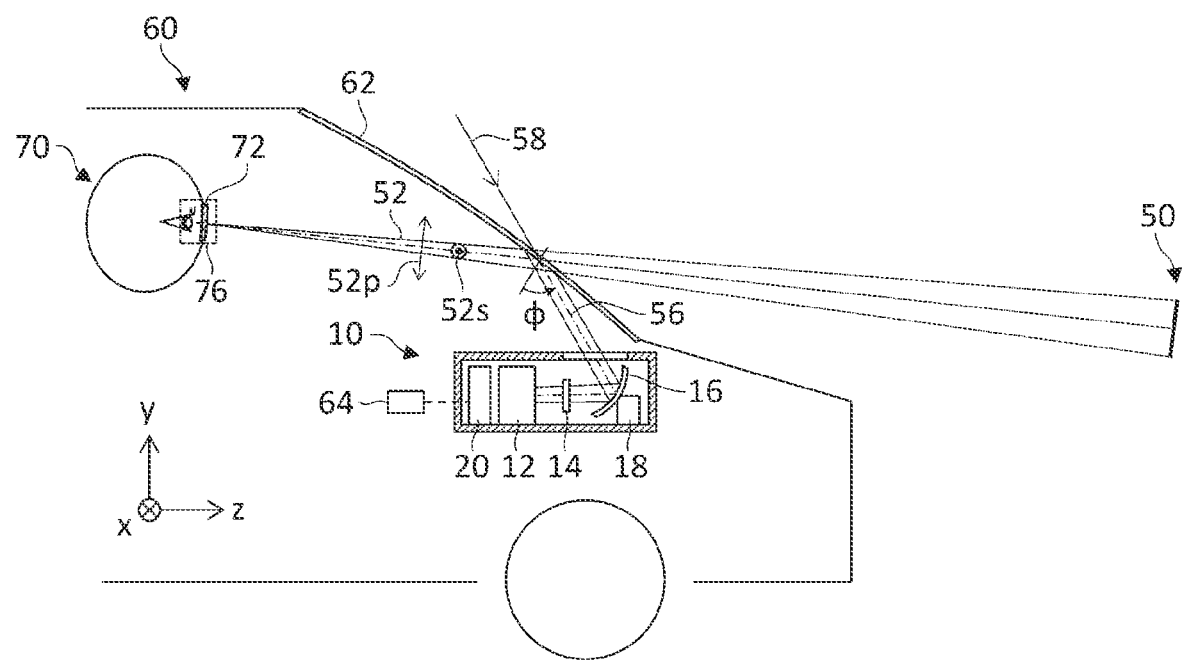
FIG. 1 schematically shows an example of installation of a virtual image display device according to the embodiment.

FIG. 1 schematically shows an example of installation of a virtual image display device 10 according to the embodiment. In this embodiment, a virtual image display device 10 is installed in a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting a projection light 52 onto a windshield 62. A driver 70 (i.e., a user) can see the virtual image 50 superimposed on the actual scenery via the windshield 62. Referring to the FIG. 1, the direction of travel (longitudinal direction) of the vehicle 60 is denoted as the z direction, the vertical direction (up/down direction) of the vehicle 60 is denoted as the y direction, and the transversal direction of the vehicle 60 is denoted as the x direction.

The virtual image display device 10 includes an image projection unit 12, an intermediate image screen 14, a projection mirror 16, an angle adjustment mechanism 18, and a control device 20. The virtual image display device 10 is connected to an external device 64 mounted on the vehicle 60.

The external device 64 is a device for generating original data for a display image displayed as the virtual image 50. The external device 64 may be, for example, an Electronic Control Unit (ECU) for the vehicle 60, a navigation device, or a mobile device such as a cell phone, smartphone, and tablet. The external device 64 transmits, to the control device 20, image data necessary to display the virtual image 50, information indicating the content and type of the image data, and information related to the vehicle 60 such as the speed and current position of the vehicle 60.

The image projection unit 12 generates a projection light 52 for presenting the virtual image 50 and outputs the projection light 52 toward the intermediate image screen 14. The intermediate image screen 14 is comprised of a light diffusion plate, etc. and forms an intermediate image (real image) based on the projection light 52. The projection mirror 16 projects the projection light 52 transmitted through the intermediate image screen 14 toward the windshield 62. The angle adjustment mechanism 18 adjusts the angle of the projection mirror 16 in accordance with the height of the eyes of the driver 70 so that the projection light 52 is projected toward an eye box region 76 in which the driver 70 can view the virtual image 50. The eye box region 76 is a substantially rectangular region that covers both eyes of the driver 70. For example, the eye box region 76 is set such that the transversal direction (x direction) is longer, and the vertical direction is shorter.

The virtual image display device 10 according to the embodiment is configured to be able to determine whether sunglasses 72 worn by the driver 70 are polarized sunglasses. Polarized sunglasses are sunglasses capable of shielding or reducing the light reflected on the water surface and include a linear polarizer that shields or reduces the s-polarized component and transmits the p-polarized component. On the other hand, normal sunglasses do not include a linear polarizer and includes a neutral density (ND) filter that reduces the intensity of incident light. The background for the need to detect polarized sunglasses is the polarization dependency of the reflectance of the projection light 52 on the windshield 62.

Figure 2:
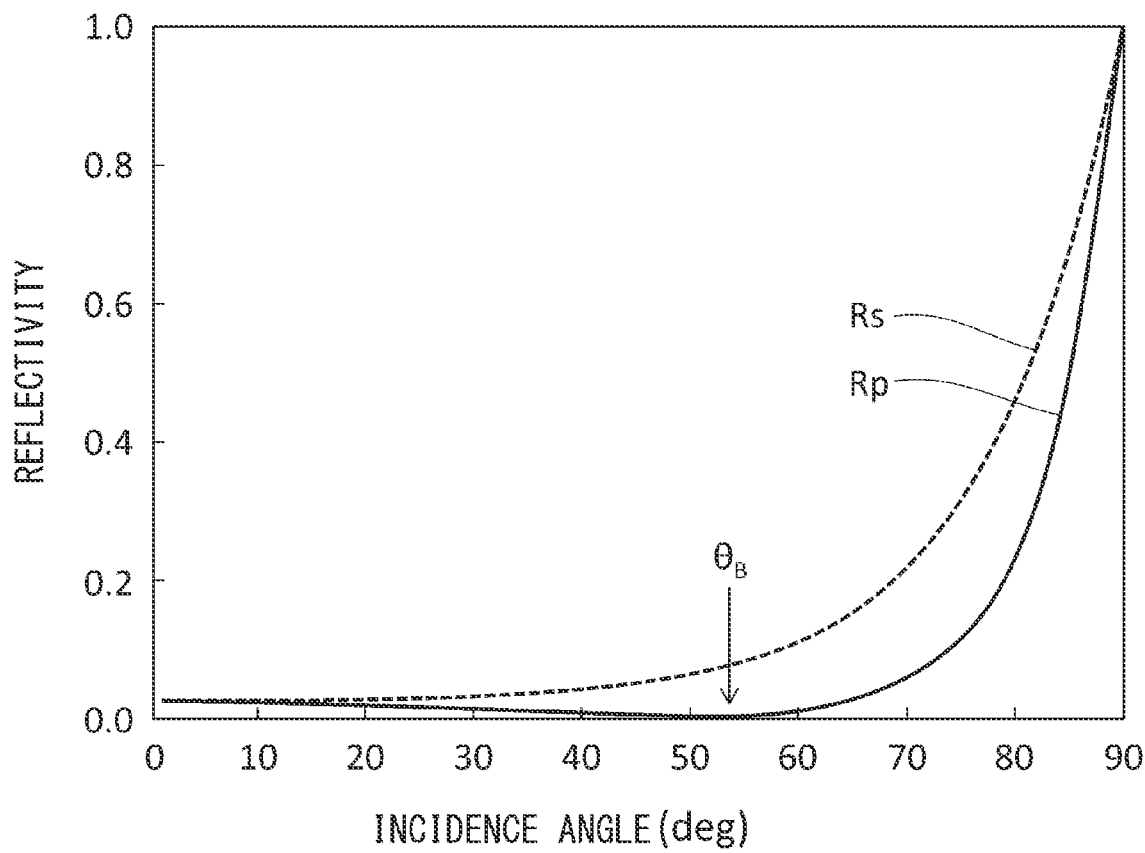
FIG. 2 is a graph showing the reflectance of the windshield.

FIG. 2 is a graph showing the reflectance of the windshield 62. The reflectance of the commonly used windshield 62 made of glass, etc. has polarization dependency. It is known that the reflectance Rp of the p-polarized component is lower than the reflectance Rs of the s-polarized component. Therefore, of the projection light 52 shown in FIG. 1, the reflectance of a first projection light 52s of the s-polarized component is relatively higher, and the reflectance of a second projection light 52p of the p-polarized component is relatively lower. In particular, the reflectance Rp of the p-polarized component will be 0 at an incidence angle called the Brewster's angle $\theta_B$ (e.g., 53°). As shown in FIG. 1, the projection light 52 projected from the virtual image display device 10 is diagonally incident on and reflected by the windshield 62, and the angles of incidence and reflection φ on the windshield 62 could take a value close to the Brewster's angle $\theta_B$. As a result, the first projection light 52s of the s-polarized component to easily arrives at the eyes of the driver 70, but the second projection light 52p of the p-polarized component does not arrive at the eyes of the driver 70 easily.

When the driver 70 is wearing polarized sunglasses in this case, the first projection light 52s of the s-polarized component is shielded or reduced by the polarized sunglasses. This makes it necessary to use the second projection light 52p of the p-polarized component to cause the driver 70 to view the projection light 52. If the driver 70 is not wearing polarized sunglasses, on the other hand, the virtual image 50 that is brighter and more viewable can be provided by using the first projection light 52s of the s-polarized component. The embodiment addresses the issue by automatically determining whether polarized sunglasses are being worn to provide the projection light 52 having a more suitable polarization component depending on whether polarized sunglasses are being worn.

The s-polarized component in the configuration of FIG. 1 is the light component linearly polarized in the first direction orthogonal to both the direction of incidence and the direction of reflection of the projection light 52 on the windshield 62. The s-polarized component represents the light component linearly polarized in the transversal direction (x direction) of the vehicle 60. Meanwhile, the p-polarized component is the light component linearly polarized in the second direction orthogonal to the first direction. The p-polarized component represents the light component linearly polarized in a direction along the yz plane defined by the vertical direction (y direction) and the longitudinal direction (z direction) of the vehicle 60.

Figure 3:
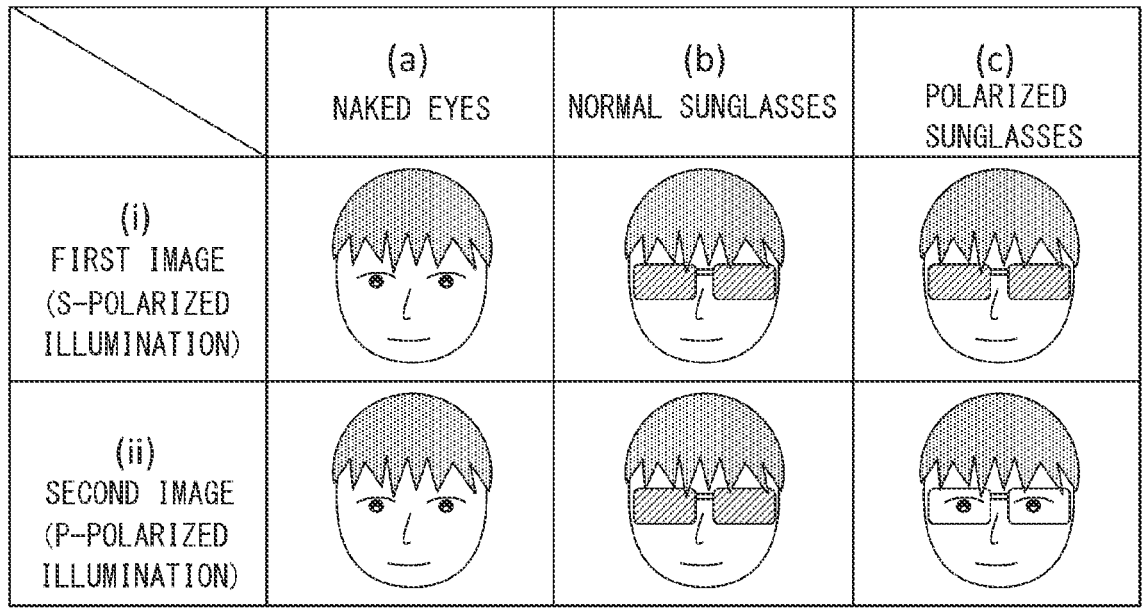
FIG. 3 schematically shows the method of determining polarized sunglasses.

FIG. 3 schematically shows the method of determining polarized sunglasses. FIG. 3 shows three cases in which the driver is (a) not wearing sunglasses (naked eyes), (b) wearing normal sunglasses and not polarized sunglasses, and (c) wearing polarized sunglasses. (i) The first image schematically shows how the face of the driver 70 will look when the face is irradiated and imaged by using an illumination light composed only of the s-polarized component (s-polarized illumination), and (ii) the second image shows how the face of the driver 70 will look when the face is irradiated and imaged by using an illumination light composed only of the p-polarized light (p-polarized illumination).

When the driver is (a) not wearing sunglasses, the first image taken under the s-polarized illumination and the second image taken under the p-polarized illumination are substantially the same. Similarly, when the driver is (b) wearing normal sunglasses, the first image taken under the s-polarized illumination and the second image taken under the p-polarized illumination are substantially the same. When the driver is (c) wearing polarized sunglasses, on the other hand, the polarized sunglasses look different in the first image taken under the s-polarized illumination and in the second image taken under the p-polarized illumination. Since the polarized sunglasses shield the s-polarized component, the polarized sunglasses look dark in the first image taken under the s-polarized illumination. On the other hand, the polarized sunglasses transmit the p-polarized component so that the polarized sunglasses look transparent in the second image taken under the p-polarized illumination. It is therefore possible to detect whether polarized sunglasses are being worn by comparing the first image taken under the s-polarized illumination and the second image taken under the p-polarized illumination.

In this embodiment, it is determined whether polarized sunglasses are being worn by referring to the light intensity of the projection light 52 reflected by the sunglasses 72 instead of imaging the face of the driver 70. Referring to FIG. 1 the virtual image display device 10 selectively projects the first projection light 52s and the second projection light 52p toward the eyes of the driver 70. The virtual image display device 10 measures the light intensity of the first projection light 52s and the second projection light 52p reflected and returning to the virtual image display device 10 along a light path 56 in which the first projection light 52s and the second projection light 52p are projected. When polarized sunglasses are being worn, the reflectance of the s-polarized component and that of the p-polarized component in the eye box region 76 differ significantly. Therefore, it is possible to determine whether the driver 70 is wearing polarized sunglasses by comparing the intensity of the first projection light 52s reflected and the intensity of the second projection light 52p reflected.

The intensity of light incident on the virtual image display device 10 along the light path 56 when the first projection light 52s is projected (also called the first light intensity $I_1$) is given by the following expression (1):

$$I_1 = Is \cdot Rs \cdot R_1 \cdot Rs + Io \quad (1)$$

where Is denotes the light intensity of the first projection light 52s output from the virtual image display device 10, Rs denotes the reflectance of the s-polarized component on the windshield 62, $R_1$ denotes the reflectance of the s-polarized component in the eye box region 76, and Io denotes the light intensity of external light 58, etc. entering the light path 56 from above the windshield 62 (from outside the vehicle) (also called background light intensity). The reflectance Rs on the windshield 62 is multiplied twice because the light is reflected twice on the windshield 62 on the outward and return paths.

Similarly, the intensity of light incident on the virtual image display device 10 along the light path 56 when the second projection light 52p is projected (also called the second light intensity $I_2$) is given by the following expression (2):

$$I_2 = Ip \cdot Rp \cdot R_2 \cdot Rp + Io \quad (2)$$

where Ip denotes the light intensity of the second projection light 52p output from the virtual image display device 10, Rp denotes the reflectance of the p-polarized component on the windshield 62, $R_2$ denotes the reflectance of the p-polarized component in the eye box region 76. The reflectance Rp on the windshield 62 is multiplied twice because the light is reflected twice on the windshield 62 on the outward and return paths.

Based on the above expressions (1) and (2), the ratio between the reflectance $R_1$ of the s-polarized component and the reflectance of the p-polarized component in the eye box region 76 is given by the following expression (3).

$$R_2/R_1 = [(I_2 - Io) \cdot Is \cdot Rs^2]/[(I_1 - Io) \cdot Ip \cdot Rp^2] \quad (3)$$

where Is, Ip, Rs, Rp are known values, and the background light intensity Io represents the intensity of light incident on the virtual image display device 10 along the light path 56 when the projection light 52 is not projected. Therefore, the reflectance ratio $R_2/R_1$ in the eye box region 76 can be calculated by measuring $I_1$, $I_2$, Io. When polarized sunglasses are being worn, the reflectance ratio $R_2/R_1$ will be equal to or greater than a predetermined value (e.g., 1, 5, 10, 100). It is therefore possible to determine whether polarized sunglasses are being worn based on the value of the reflectance ratio $R_2/R_1$ calculated.

Figure 4:
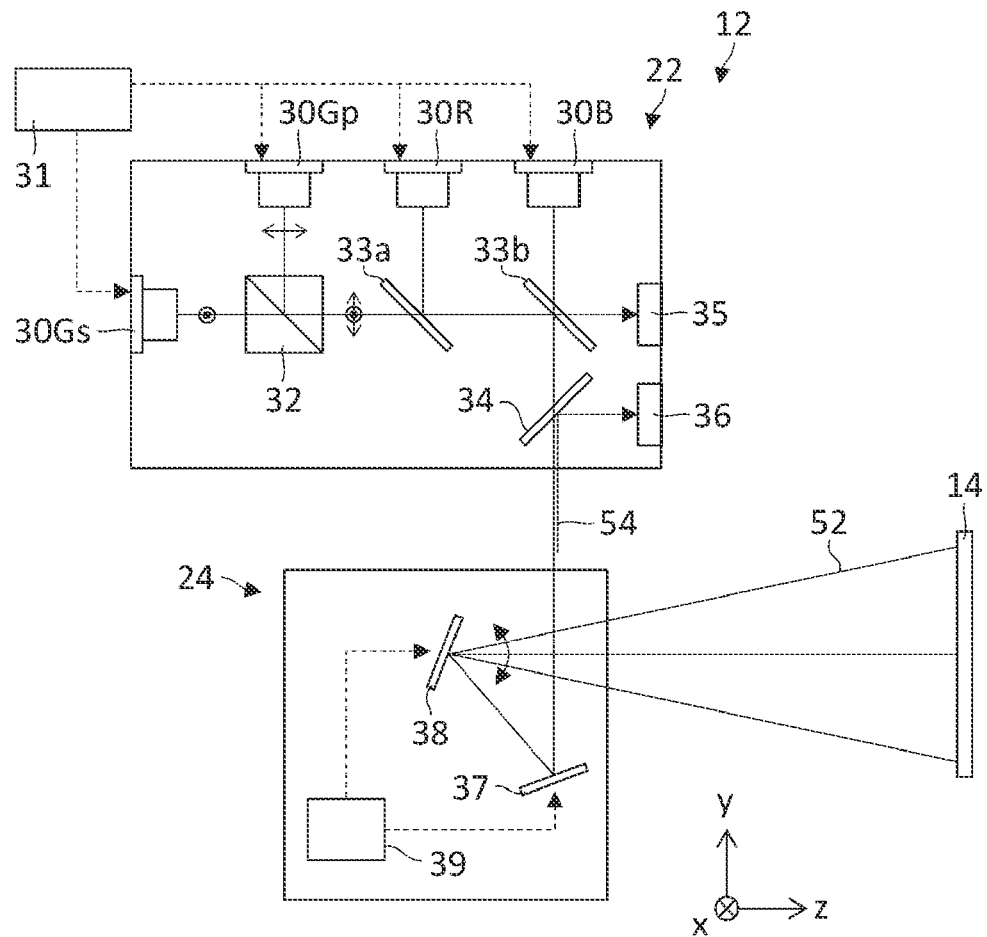
FIG. 4 schematically shows the configuration of the image projection unit according to the embodiment.

FIG. 4 schematically shows the configuration of the image projection unit 12 according to the embodiment. The image projection unit 12 includes a light source unit 22 and a scan unit 24. The light source unit 22 generates a laser light originating the projection light 52. The scan unit 24 generates the projection light 52 for presenting a desired display image by scanning the laser light in a raster scan pattern.

The light source unit 22 includes a first green light source 30Gs, a second green light source 30Gp, a red light source 30R, a blue light source 30B, a light source driving unit 31, a polarizing beam splitter 32, a first dichroic mirror 33a, a second dichroic mirror 33b, an active mirror 34, a light source light measurement unit 35, and a reflected light measurement unit 36.

The first green light source 30Gs is a green laser light source having an oscillation mode for linear polarization and is arranged to output an s-polarized first green laser light. The second green light source 30Gp is a green laser light source having an oscillation mode for linear polarization and is arranged to output a p-polarized second green laser light. The red light source 30R is a red laser light source having an oscillation mode for linear polarization. The red light source 30R is arranged to produce, for example, a polarization direction rotated by 45° with respect to the s-polarization direction and outputs a red laser light including both a s-polarized component and a p-polarized component. The blue light source 30B is a blue laser light source having an oscillation mode for linear polarization. The blue light source 30B is arranged to produce, for example, a polarization direction rotated by 45° with respect to the s-polarization direction and outputs a blue laser light including both a s-polarized component and a p-polarized component.

Currently, it is difficult to produce a high output from a green semiconductor laser light source as compared to red and blue semiconductor laser light sources. The light intensity of green tends to be insufficient to generate a highly bright color image. The embodiment makes it possible to obtain a highly bright green laser light by preparing the first green light source 30Gs for s polarization and the second green light source 30Gp for p polarization separately and blending the green laser lights output from the respective sources. In a variation, laser light sources for s polarization and p polarization may be prepared separately for at least one of red and blue, and a red laser light or a blue laser light may be obtained by blending lights.

The light source driving unit 31 drives the four laser light sources 30Gs, 30Gp, 30R, and 30B. The light source driving unit 31 changes the light emission intensity of the laser light sources 30Gs, 30Gp, 30R, and 30B according to the raster scan period of the scan unit 24 to generate the projection light 52 having a light intensity corresponding to the brightness values of the pixels of the display image.

The light source driving unit 31 adjusts the proportion (white balance) between the light emission intensities of the respective laser light sources 30Gs, 30Gp, 30R, and 30B so that the color tone of the virtual image 50 based on the first projection light 52s matches the color tone of the virtual image 50 based on the second projection light 52p. The light source driving unit 31 has, for example, the first white balance used when generating the first projection light 52s and the second white balance used when generating the second projection light 52p. The first white balance is a proportion of the light emission intensity of the first green light source 30Gs relative to the light emission intensity of the red light source 30R and the blue light source 30B that is used when the first projection light 52s is generated. The second white balance is a proportion of the light emission intensity of the second green light source 30Gp relative to the light emission intensity of the red light source 30R and the blue light source 30B that is used when the second projection light 52p is generated.

The values of the first white balance and the second white balance are defined in accordance with the reflectance Rs of the s-polarized component and the reflectance Rp of the p-polarized component on the windshield 62. For example, configuring the light emission intensity of the red light source 30R for generating the first projection light 52s to be equal to the light emission intensity of the red light source 30R for generating the second projection light 52p results in the same brightness of the red lights arriving at the eyes of the driver 70. The same is true of the blue light source 30B. Meanwhile, configuring the light emission intensity of the first green light source 30Gs for generating the first projection light 52s to be equal to the light emission intensity of the second green light source 30Gp for generating the second projection light 52p will not result in the same brightness of the green lights arriving at the eyes of the driver 70 because of the difference in reflectance on the windshield 62 between the s-polarized component and the p-polarized component. For this reason, the color tone of the first projection light 52s and the color tone of the second projection light 52p will not match. Given that the light emission intensity of the first green light source 30Gs is 1, the light emission intensity of the second green light source 30Gp may be, for example, configured to be (R/Rp) to equalize the brightness of the green lights arriving at the eyes of the driver 70. Consequently, the value of the second white balance will be (Rs/Rp), given that the value of the first white balance is 1. Thus, the color tone of the virtual image 50 based on the first projection light 52s can match the color tone of the virtual image 50 based on the second projection light 52p by causing the first white balance and the second white balance to have different values.

The polarizing beam splitter 32 blends the s-polarized first green laser light emitted from the first green light source 30Gs and the p-polarized second green laser light emitted from the second green light source 30Gp to generate the green laser light including both the s-polarized component and the p-polarized component. The first dichroic mirror 33a blends the red laser light emitted from the red light source 30R and the green laser light emitted from the polarizing beam splitter 32. The second dichroic mirror 33b blends the blue laser light emitted from the blue light source 30B and the green and red laser lights output from the first dichroic mirror 33a. The red, green, and blue laser lights output from the second dichroic mirror 33b pass through the active mirror 34 and travel toward the scan unit 24.

The light source light measurement unit 35 measures the light intensity of the laser light transmitted through or reflected by the second dichroic mirror 33b and monitors the light emission intensities of the respective laser light sources 30Gs, 30Gp, 30R, and 30B. The reflected light measurement unit 36 measures the light intensity of a returning light 54 incident from outside the image projection unit 12 along the light path 56 (see FIG. 1), on which the projection light 52 is projected, and reflected by the active mirror 34. The reflected light measurement unit 36 is configured to measure the first light intensity $I_1$, the second light intensity $I_2$, and the background light intensity Io used to determine whether polarized sunglasses are being worn. The light source light measurement unit 35 and the reflected light measurement unit 36 are comprised of, for example, photodiodes.

The active mirror 34 is an active optical element configured such that the transmittance and the reflectance are variable. The active mirror 34 is configured to be switchable to an ON state in which the transmittance and the reflectance are about 50% and an OFF state in which the transmittance is substantially 100% (i.e., the reflectance is substantially 0%). The active mirror 34 is placed in the ON state when the first light intensity $I_1$, the second light intensity $I_2$, and the background light intensity Io are measured to cause at least a portion of the returning light 54 incident on the active mirror 34 to be incident on the reflected light measurement unit 36. The active mirror 34 is placed in the OFF state when the projection light 52 for presenting a display image is generated to inhibit the display image from being darkened due to the insertion of the active mirror 34.

The scan unit 24 includes a first scan mirror 37, a second scan mirror 38, and a scan driving unit 39. The first scan mirror 37 is rotated to scan the laser light on the intermediate image screen 14 in the transversal direction, and the second scan mirror 38 is rotated to scan the laser light on the intermediate image screen 14 in the vertical direction. The scan driving unit 39 controls the rotation of the first scan mirror 37 and the second scan mirror 38 so that the laser light is scanned on the intermediate image screen 14 in a raster scan pattern. Raster scan of the laser light by the scan unit 24 draws a display image on the intermediate image screen 14.

The display image drawn on the intermediate image screen 14 is viewed by the driver 70 as the virtual image 50. The intermediate image screen 14 is configured to spread and equalize the projection light 52 output from the scan unit 24. It is preferable that the intermediate image screen 14 be of a type that preserves polarization in which the polarization direction is preserved before and after the light is incident on the intermediate image screen 14.

The image projection unit 12 generates two types of image display light for presenting the display image. The image projection unit 12 selectively generates the first display light projected when polarized sunglasses are not being worn and the second display light projected when polarized sunglasses are being worn. The first display light is an image display light composed of the s-polarized component linearly polarized in the first direction and is generated by using the laser lights emitted from the first green light source 30Gs, the red light source 30R, and the blue light source 30B. Therefore, the second green light source 30Gp is turned off when the first display light is generated. The second display light is an image display light composed of the p-polarized component linearly polarized in the second direction and is generated by using the laser lights emitted from the second green light source 30Gp, the red light source 30R, and the blue light source 30B. Therefore, the first green light source 30Gs is turned off when the second display light is generated.

The image projection unit 12 generates two types of illumination light (projection light for illumination) to measure the first light intensity $I_1$ and the second light intensity $I_2$ used to determine whether polarized sunglasses are being worn. The projection light for illumination is used to project an illumination light having an even light intensity distribution to the eye box region 76 and differs from the image display light for presenting the display image to the driver 70. When projection light for illumination is projected, a measurement image having even brightness over the entirety of the image is presented as the virtual image 50. It can therefore be said that the projection light (or the image display light) for presenting the measurement image is the projection light for illumination. The image projection unit 12 selectively generates the first illumination light for measuring the first light intensity $I_1$ and the second illumination light for measuring the second light intensity $I_2$. The first illumination light is composed only of the s-polarized light linearly polarized in the first direction and is generated by using only the first green laser light emitted from the first green light source 30Gs. The second illumination light is composed only of the p-polarized light linearly polarized in the second direction and is generated by using only the second green laser light emitted from the second green light source 30Gp. Therefore, the red light source 30R and the blue light source 30B that emit laser lights containing both the s-polarized component and the p-polarized component are turned off when the projection light for illumination is generated.

Figure 5:
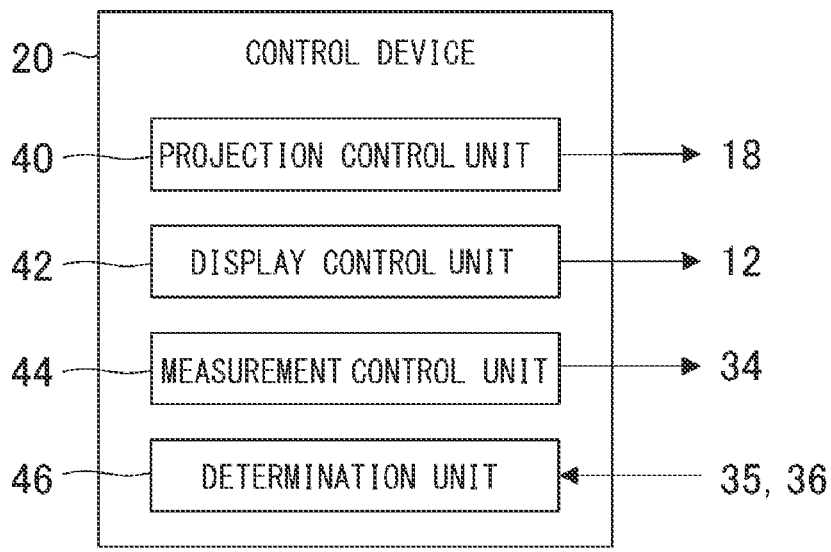
FIG. 5 is a block diagram schematically showing the function and configuration of the control device according to the embodiment.

FIG. 5 is a block diagram schematically showing the function and configuration of the control device 20 according to the embodiment. The control device 20 includes a projection control unit 40, a display control unit 42, a measurement control unit 44, and a determination unit 46. The functional blocks depicted are implemented in hardware such as devices and mechanical apparatus exemplified by a CPU and a memory of a computer, and in software such as a computer program. FIG. 5 depicts functional blocks implemented by the cooperation of these elements. Therefore, it will be understood by those skilled in the art that these functional blocks may be implemented in a variety of manners by a combination of hardware and software.

The projection control unit 40 controls the operation of the angle adjustment mechanism 18 to change the angle of the projection mirror 16 and adjust the light path 56 of the projection light 52. The projection control unit 40 adjusts the light path 56 so that the projection light 52 is projected to the eye box region 76 determined by the height of the eyes of the driver 70. The projection control unit 40 causes the angle adjustment mechanism 18 to operate based on a user input operation from the driver 70.

The display control unit 42 controls the operation of the image projection unit 12 to generate the image display light and the projection light for illumination. The display control unit 42 acquires display image data from the external device 64 and generates the image display light by controlling the operation of the light source driving unit 31 based on the display image data. The display control unit 42 controls the operation of the light source driving unit 31 so that the laser light having light intensities corresponding to the brightness values of red, green, and blue of each pixel of the display image is output in synchronization with the period of raster scan by the scan unit 24. The display control unit 42 generates the projection light for illumination that produces uniform brightness over the entirety of the image, by performing raster scan with the laser light, maintaining light emission intensities of the first green light source 30Gs or the second green light source 30Gp constant.

The measurement control unit 44 controls the operation of the active mirror 34 to make it possible to measure the first light intensity $I_1$, the second light intensity $I_2$, and the background light intensity Io used to determine whether polarized sunglasses are being worn. The measurement control unit 44 causes the reflected light measurement unit 36 to measure the first light intensity $I_1$ by turning the active mirror 34 on when the first illumination light is projected. The measurement control unit 44 causes the reflected light measurement unit 36 to measure the second light intensity $I_2$ by turning the active mirror 34 on when the second illumination light is projected. The measurement control unit 44 causes the reflected light measurement unit 36 to measure the background light intensity Io by turning the active mirror 34 on when the projection light 52 is not projected from the image projection unit 12. The measurement control unit 44 causes the display image with higher brightness to be presented by turning the active mirror 34 off when the first display light or the second display light is projected.

The determination unit 46 determines whether the driver 70 is wearing polarized sunglasses based on the measurement result of the light source light measurement unit 35 and the reflected light measurement unit 36. The determination unit 46 acquires the light intensity Is of the first green laser light measured by the light source light measurement unit 35 and the first light intensity $I_1$ measured by the reflected light measurement unit 36 when the first illumination light is projected. The determination unit 46 acquires the light intensity Ip of the second green laser light measured by the light source light measurement unit 35 and the second light intensity $I_2$ measured by the reflected light measurement unit 36 when the second illumination light is projected. The determination unit 46 acquires the background light intensity Io measured by the reflected light measurement unit 36 when the projection light 52 is not projected. The determination unit 46 substitutes the values of Is, Ip, $I_1$, $I_2$ thus acquired into the above expression (3) to calculate the reflectance ratio $R_2/R_1$ between the s-polarized component and the p-polarized component in the eye box region 76. When the reflectance ratio $R_2/R_1$ thus calculated is equal to or higher than a predetermined value, the determination unit 46 determines that polarized sunglasses are being worn. When the reflectance ratio $R_2/R_1$ thus calculated is lower than the predetermined value, the determination unit 46 determines that polarized sunglasses are not being worn.

The determination unit 46 may determine whether polarized sunglasses are being worn based only on some of Is, Ip, $I_1$, $I_2$, and Io. For example, when the light intensities Is, Ip of the first illumination light and the second light intensity are similar, the measurement result of the light source light measurement unit 35 may not be used, and it may be assumed that Is=Ip in the above expression (3). Further, when, for example, the background light intensity Io is considered to be sufficiently smaller than the first light intensity $I_1$ and the second light intensity $I_2$, the background light intensity Io may not be measured, and it may be assumed that Io=0 in the above expression (3). The determination unit 46 may, for example, determine whether polarized sunglasses are being worn based only on the measurement results of the first light intensity $I_1$ and the second light intensity $I_2$.

The determination unit 46 may maintain the reflectances Rs, Rp of the s-polarized component and the p-polarized component on the windshield 62 as fixed values or maintain them as variable values that vary depending on the incidence angle φ of the projection light 52 on the windshield 62. The determination unit 46 may identify the incidence angle φ of the projection light 52 on the windshield 62 based on the angle of the projection mirror 16 to determine the reflectances Rs, Rp corresponding to the incidence angle φ, using the graph shown in FIG. 2.

The display control unit 42 may adjust the light emission intensities of the first green light source 30Gs and the second green light source Gp so that the first illumination light and the second illumination light measured by the reflected light measurement unit 36 have the same brightness. The first illumination light and the second illumination light are reflected by the windshield 62 before being projected onto the face of the driver 70 and are reflected again by the windshield 62 before arriving at the reflected light measurement unit 36. Therefore, the brightness levels of the first illumination light and the second illumination light arriving at the reflected light measurement unit 36 are affected by the square values of the reflectances Rs, Rp of the s-polarized component and the p-polarized component on the windshield 62, respectively. For example, given that the light intensity of the first green light source 30Gs emitted when the first illumination light is generated is 1, the brightness levels of the first illumination light and the second illumination light as viewed from the reflected light measurement unit 36 can be equalized by configuring the light emission intensity of the second green light source 30Gp to be $(Rs/Rp)^2$ when the second illumination light is generated. The light intensities Is, Ip of the first illumination light and the second illumination light may be determined irrespective of the reflectances Rs, Rp of the s-polarized component and the p-polarized component on the windshield 62. For example, the light intensity Ip of the second illumination light may be configured to be relatively higher than (e.g., twice, three times, five times, etc. as high as) the light intensity Is of the first illumination light.

When the determination unit 46 determines that polarized sunglasses are not being worn, the display control unit 42 causes the image projection unit 12 to project the first display light composed of the s-polarized component. Since the s-polarized component has a higher reflectance on the windshield 62 than the p-polarized component, the display image having higher brightness can be presented to the driver 70 by using the first display light. When the determination unit 46 determines that polarized sunglasses are being worn, the display control unit 42 causes the image projection unit 12 to project the second display light composed of the p-polarized component. By projecting the second display light of the p-polarized component, the display image can be presented to the driver 70 across the polarized sunglasses.

Figure 6:
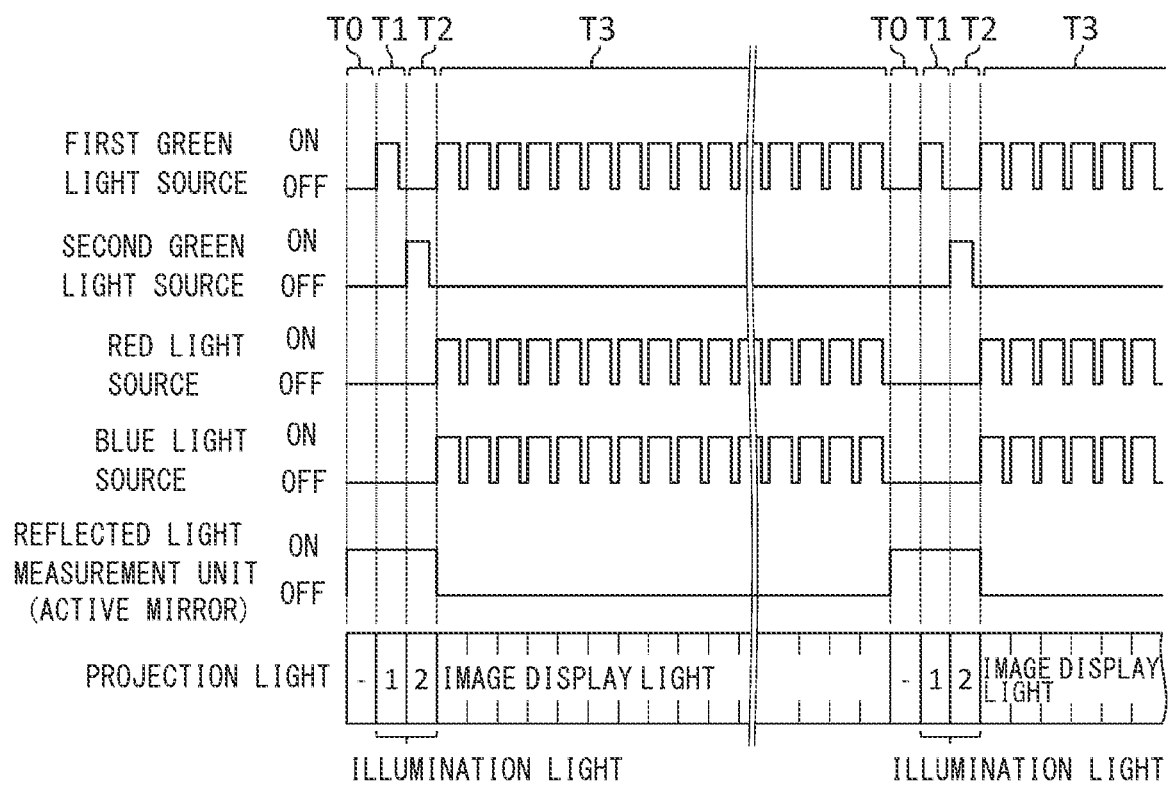
FIG. 6 is a timing chart schematically showing the operation of the image projection unit.

FIG. 6 is a timing chart schematically showing the operation of the image projection unit 12. The image projection unit 12 operates to switch between a non-display period T0, a first period T1, a second period T2, and a third period T3 periodically. The non-display period T0 is a period in which all light sources are turned off. The first period T1 is a period in which only the first green light source 30Gs is turned, and the first illumination light is projected. The second period T2 is a period in which only the second green light source 30Gp is turned on, and the second illumination light is projected. In the non-display period T0, the first period T1, and the second period T2, the active mirror 34 is turned on, and the light intensities Io, $I_1$, and $I_2$ necessary to determine whether polarized sunglasses are being worn are measured by the reflected light measurement unit 36.

The third period T3 is a period in which the image display light is projected, and the display image is presented to the driver 70. In the third period T3, the light sources used to generate the image display light are turned on. FIG. 6 shows a case in which it is determined that polarized sunglasses are not being worn, and the first display light of the s-polarized component is projected in the third period T3 by using the first green light source 30Gs. When it is determined that polarized sunglasses are being worn, the second display light of the p-polarized component is projected in the third period T3 by using the second green light source 30Gp.

By switching between the non-display period T0, the first period T1, the second period T2, and the third period T3 periodically, the display control unit 42 presents the display image that should be presented to the driver 70, intermittently performing measurements for detecting polarized sunglasses. The display control unit 42 switches between the periods T0-T3 in synchronization with the period of raster scan by the scan unit 24. The duration of each of the non-display period T0, the first period T1, and the second period T2 corresponds to the period of time required for a single raster scan for drawing the entirety of one image. Meanwhile, the third period is set to have a longer duration than the other periods. For examples, the third period lasts 1 second, 5 seconds, 10 seconds, 30 seconds, 1 minute, or 5 minutes.

The display control unit 42 ensures that the non-display period T0, the first period T1, and the second period T2 are temporally continuous with each other. This minimizes the variation in the measurement condition between the non-display period T0, the first period T1, and the second period T2 and prevents a difference between the light intensities Io, $I_1$, and $I_2$ measured by the reflected light measurement unit 36 from being created by a factor other than the projection light for illumination projected. For example, a measurement error is prevented from being created due to the variation in the external light 58 incident on the image projection unit 12 or the change in the posture of the driver 70.

The reflected light measurement unit 36 measures the first light intensity $I_1$ over the first period T1 corresponding to the period of time of a single raster scan to make it possible to calculate a time-integrated value of the first light intensity $I_1$ in the first period T1. Similarly, the reflected light measurement unit 36 measures the second light intensity $I_2$ over the second period T2 corresponding to the period of time of a single raster scan to make it possible to calculate a time-integrated value of the second light intensity $I_2$ in the second period T2. The range in which the first illumination light and the second illumination light are scanned by the scan unit 24 corresponds to the eye box region 76 in which the sunglasses 72 are located. For this reason, the entirety of the eye box region 76 can be scanned for measurement by measuring the intensity of the returning light 54 over the period of a single raster scan. When polarized sunglasses are being worn, it is presumed that the majority of the eye box region 76 is occupied by the polarized sunglasses. By scanning the entirety of the eye box region 76 and integrating the measurement value, therefore, the entirety of the polarized sunglasses can be scanned for measurement. As a result, the difference between the measurement value of the first light intensity $I_1$ and that of the second light intensity $I_2$ caused by the difference between the reflectance of the s-polarized component and that of the p-polarized component on the polarized sunglasses can be distinctively identified, and the precision of determination as to whether polarized sunglasses are being worn can be increased.

The determination unit 46 may, for example, determine whether polarized sunglasses are being worn based on the background light intensity Io measured in a single non-display period T0, the first light intensity $I_1$ measured in a single first period T1, and the second light intensity measured in a single second period T2. The determination unit 46 may determine whether polarized sunglasses are being worn, based on a plurality of background light intensities Io measured in a plurality of non-display periods T0, a plurality of first light intensities $I_1$ measured in a plurality of first periods T1, and a plurality of second light intensities measured in a plurality of second periods T2. The determination unit 46 may determine whether polarized sunglasses are being worn based on the average value or the mode value of the plurality of light intensities Io, $I_1$, $I_2$.

According to the embodiment, it is possible to automatically determine whether the driver 70 is wearing polarized sunglasses by using the virtual image display device 10. This allows the virtual image display device 10 to generate a suitable image display light depending on whether polarized sunglasses are being worn. For example, the s-polarized first projection light 52 that is easily reflected by the windshield 62 may be generated when polarized sunglasses are not being worn and the p-polarized second projection light 52p that can be viewed across the polarized sunglasses may be generated when polarized sunglasses are being worn. As a result, power consumption in the virtual image display device 10 can be reduced as compared with a case where both the first projection light 52s and the second projection light 52p are generated irrespective of whether polarized sunglasses are being worn. Since it is made unnecessary to light the first green light source 30Gs and the second green light source 30Gp simultaneously to generate both the first projection light 52s and the second projection light 52P, an increase in the operating temperature due to simultaneous lighting is prevented, and a long life of the light sources can be realized.

The embodiment only requires measuring the light intensity of the returning light 54 from the face of the driver 70 (the eye box region 76) instead of imaging the face of the driver 70 with a camera, etc. It is therefore possible to determine whether polarized sunglasses are being worn more easily than by using a camera. Specifically, it is not necessary to provide an imaging device or provide a high-performance CPU for analyzing an image taken so that the cost for adding a function of determining polarized sunglasses is saved.

The present invention has been described above with reference to the embodiment but is not limited to the embodiment. Appropriate combinations or replacements of the features of the illustrated examples are also encompassed by the present invention.

In the embodiment described above, it is determined whether polarized sunglasses are being worn by using the measurement result of the reflected light measurement unit 36 comprised of a photodiode, etc. In an alternative embodiment, an imaging element such as a CCD sensor or a CMOS sensor may be used to image the light returning from the eye box region 76 toward the image projection unit to determine whether polarized sunglasses are being worn based on the image taken.

Figure 7:
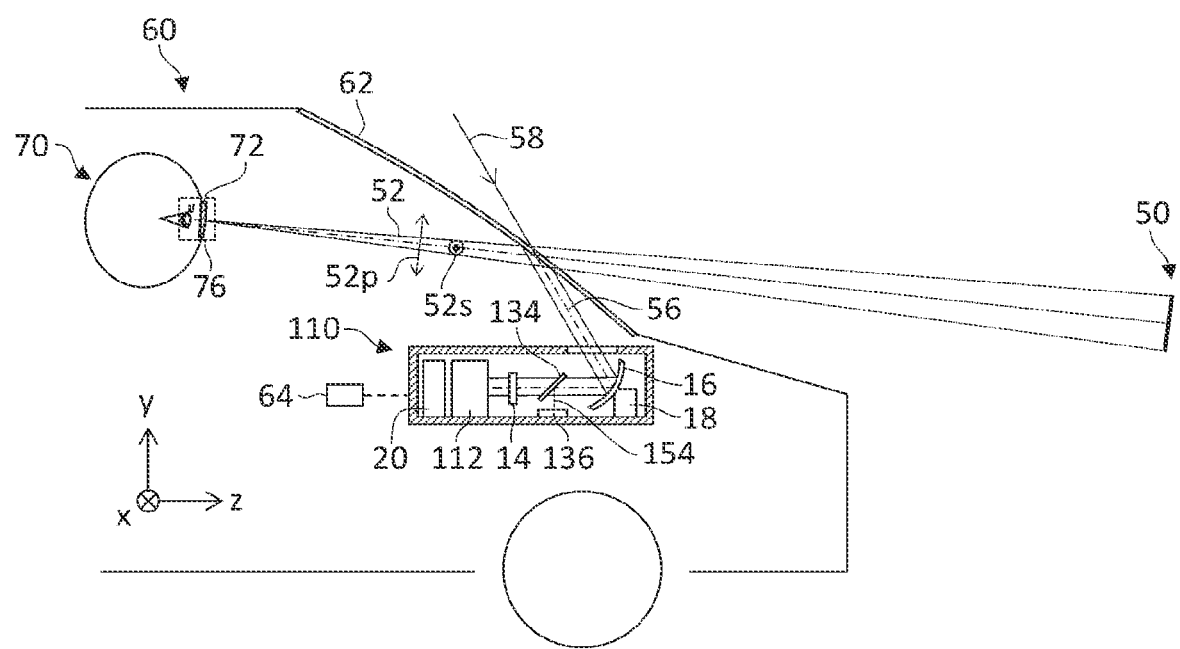
FIG. 7 schematically shows an example of installation of a virtual image display device according to another embodiment.

FIG. 7 schematically shows an example of installation of a virtual image display device 110 according to another embodiment. In this embodiment, an active mirror 134 is provided between the intermediate image screen 14 and the projection mirror 16, and the light reflected by the active mirror 134 is measured by a reflected light measurement unit 136. The reflected light measurement unit 136 includes an imaging element such as a CCD sensor or a CMOS sensor and takes an image based on a reflected light 154 reflected by the active mirror 134. The active mirror 134 reflects the reflected light 154 returning from the eye box region 76 toward the intermediate image screen 14 via the light path 56 of the projection light 52. An image projection unit 112 is configured in a manner similar to that of the image projection unit 12 according to the embodiment described above except that it does not include the active mirror 34 and the reflected light measurement unit 36 provided inside the image projection unit 12.

The measurement control unit 44 controls the operation of the active mirror 134 to allow the reflected light measurement unit 136 to take a first measurement image, a second measurement image, and a background light image used to determine whether polarized sunglasses are being worn. The measurement control unit 44 causes the reflected light measurement unit 136 to take the first measurement image by turning the active mirror 134 on when the first illumination light is projected. The measurement control unit 44 causes the reflected light measurement unit 136 to take the second measurement image by turning the active mirror 134 on when the second illumination light is projected. The measurement control unit 44 causes the reflected light measurement unit 136 to measure the background light image by turning the active mirror 134 on when the projection light 52 is not projected from the image projection unit 112. The measurement control unit 44 causes the display image with higher brightness to be presented by turning the active mirror 134 off when the first display light or the second display light is projected.

The determination unit 46 generates a differential image based on the first measurement image, the second measurement image, and the background light image taken by the reflected light measurement unit 136 and determines whether polarized sunglasses are being worn based on the differential image. The "differential image" is an image in which the brightness value of each pixel is comprised of a differential value (=first brightness value−second brightness value) obtained by subtracting (ii) the brightness value of each pixel forming the second image shown in FIG. 3 (also referred to as the second brightness value) from (i) the brightness value of each pixel forming the first image shown in FIG. 3 (also referred to as the first brightness value). The brightness value of each pixel in the first image represents the reflectance $R_1$ of the s-polarized component in the eye box region 76. The brightness value of each pixel in the second image represents the reflectance $R_2$ of the p-polarized component in the eye box region 76. Therefore, the brightness value of each pixel in the differential image represents a difference $(R_1-R_2)$ between the reflectance $R_1$ of the s-polarized component and the reflectance $R_2$ of the p-polarized component in the eye box region 76.

The determination unit 46 calculates the difference in reflectance $(R_1-R_2)$ represented by (iii) the brightness value of each pixel in the differential image by, for example, using the following expression (4).

$$R_1/R_2=[(I_1-Io)/Is/Rs^2]-[(I_2-Io)/Ip/Rp^2] \qquad (4)$$

where $I_1$ denotes the brightness value of each pixel in the first measurement image, $I_2$ denotes the brightness value of each pixel in the second measurement image, Io denotes the brightness value of each pixel in the background light image, Is denotes the light intensity of the first illumination light, Ip denotes the light intensity of the second illumination light, Rs denotes the reflectance of the s-polarized component on the windshield 62, and Rp denotes the reflectance of the p-polarized component on the windshield 62. The brightness value of each pixel in the first measurement image corresponds to the first light intensity $I_1$ given by the expression (1) above, and the brightness value of each pixel in the second measurement image corresponds to the second light intensity $I_2$ given by the expression (2) above. The brightness value of each pixel in the background light image corresponds to the background light intensity Io above.

Figure 8:
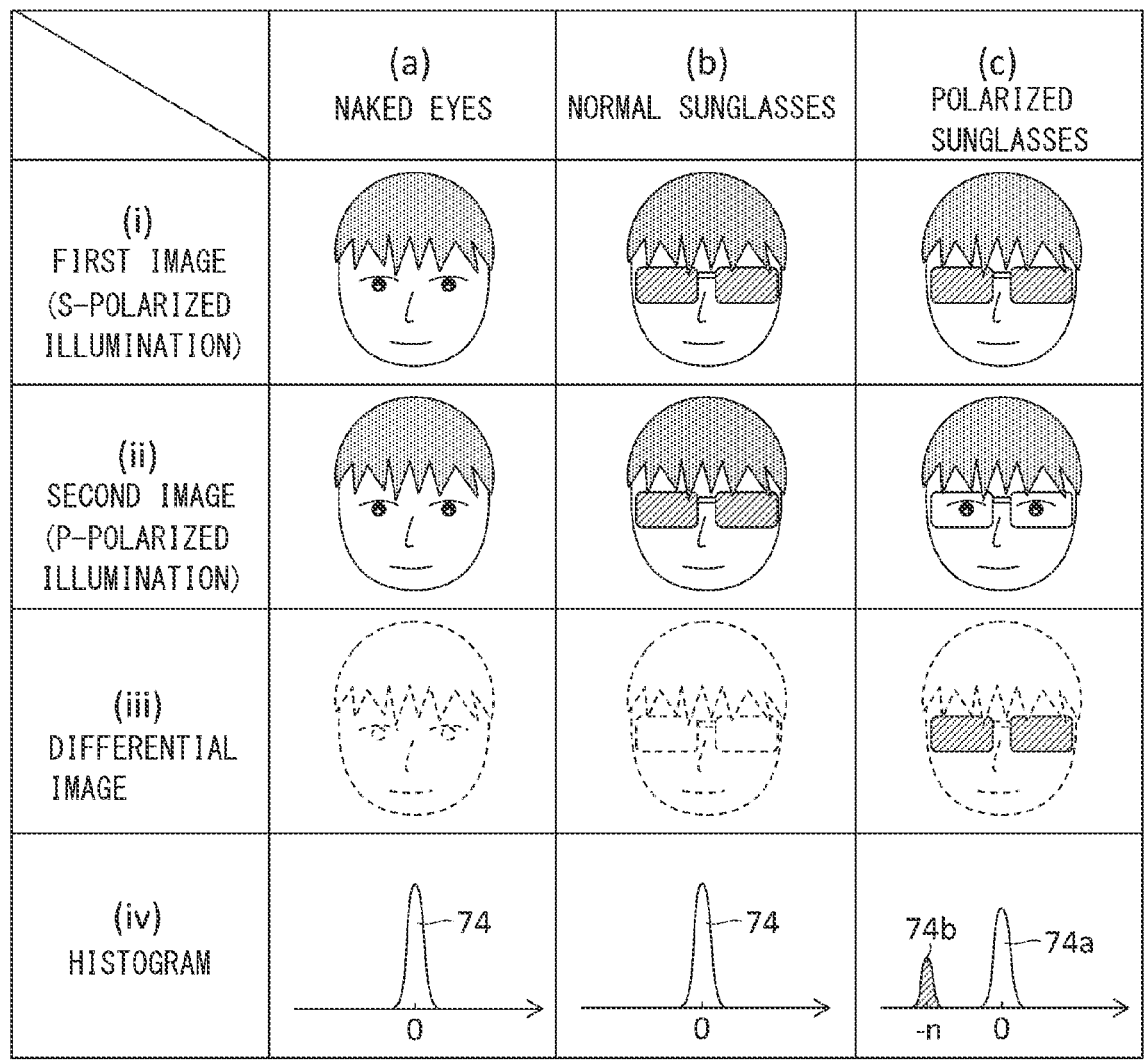
FIG. 8 schematically shows the method of determining polarized sunglasses according to another embodiment.

FIG. 8 schematically shows the method of determining polarized sunglasses according to another embodiment and shows (iii) the differential image and (iv) the histogram of the differential image in addition to (i) the first image and (ii) the second image corresponding to those in FIG. 3 above. The first image and the second image differ from the first measurement image and the second measurement image in that contribution from the background light component included in the background light image and attenuation in the light intensity due to the reflectance Rs, Rp on the windshield 62 is removed. In other words, the first image and the second image differ from the first measurement image and the second measurement image in that the first image and the second image are not images taken by using reflection on the windshield 62 but represent images capturing the face of the driver 70 directly. The histogram is a graph representation of the distribution of brightness values of the pixels forming the image. The horizontal axis represents brightness values, and the vertical axis represents the number of pixels.

When the driver is (a) not wearing sunglasses, the first image and the second image are substantially the same so that the brightness values in the differential image are substantially zero, and virtually nothing is captured in the differential image. As a result, a peak 74 is detected only in the neighborhood of zero brightness value in the histogram of the differential image. Similarly, when the driver is (b) wearing normal sunglasses, the first image and the second image are substantially the same. Virtually nothing is captured in the differential image, and the peak 74 is detected only in the neighborhood of zero brightness value in the histogram of the differential image. When the driver is (c) wearing polarized sunglasses, the polarized sunglasses look different in the first image and in the second image. Since the polarized sunglasses shield the s-polarized component, the polarized sunglasses look dark in the first image under the s-polarized illumination. On the other hand, the polarized sunglasses transmit the p-polarized component so that the polarized sunglasses look transparent in the second image under the p-polarized illumination. This results in a large absolute brightness value in the region of the polarized sunglasses in the differential image so that the polarized sunglasses will look highlighted. The first brightness value in the region of the polarized sunglasses in the first image is relatively small (i.e., dark), and the second brightness value in the region of the polarized sunglasses in the second image is relatively large (i.e., bright) so that the brightness value in the region of the polarized sunglasses in the differential image will be negative (e.g., −n). As a result, a first peak 74*a* is detected in the neighborhood of zero brightness value in the histogram of the differential image, and a second peak 74*b* is detected in the neighborhood of the brightness value of −n. By analyzing the histogram of the differential image in this way, the determination unit 46 can detect whether polarized sunglasses are being worn. In other words, the determination unit 46 can determine whether polarized sunglasses are being worn by (iii) generating a differential image and (iv) analyzing the histogram of the differential image based on the expression (4).

The determination unit 46 may determine whether polarized sunglasses are being worn based only on some of the light intensities Is, Ip of the first illumination light and the second illumination light, the first measurement image, the second measurement image, and the background light image. For example, when the light intensities Is, Ip of the first illumination light and the second light intensity are similar, the measurement result of the light source light measurement unit 35 may not be used, and it may be assumed that Is=Ip in the above expression (4). Further, when, for example, the brightness value of each pixel in the background light image is considered to be sufficiently smaller than brightness value of each pixel in the first measurement image or the second measurement image, the background light image may not be taken, and it may be assumed that Io=0 in the above expression (4).

The display control unit 42 may adjust the light emission intensities of the first green light source 30Gs and the second green light source Gp so that the brightness of the first illumination light and that of the second illumination light imaged by the reflected light measurement unit 36 are equal. The first illumination light and the second illumination light are reflected by the windshield 62 before being projected onto the face of the driver 70 and are reflected again by the windshield 62 before arriving at the reflected light measurement unit 36. Therefore, the brightness levels of the first illumination light and the second illumination light arriving at the reflected light measurement unit 136 are affected by the square values of the reflectances Rs, Rp of the s-polarized component and the p-polarized component on the windshield 62, respectively. For example, given that the light intensity of the first green light source 30Gs emitted when the first illumination light is generated is 1, the brightness levels of the first illumination light and the second illumination light as viewed from the reflected light measurement unit 36 can be equalized by configuring the light emission intensity of the second green light source 30Gp to be $(Rs/Rp)^2$ when the second illumination light is generated. When the brightness of the illumination light is corrected in this way, the determination unit 46 may determine whether polarized sunglasses are being worn based on the differential image from the first measurement image and the second measurement image.

According to this embodiment, it is equally possible to automatically determine whether the driver 70 is wearing polarized sunglasses by using the first measurement image, the second measurement image, and the background light image taken by the reflected light measurement unit 136.

What is claimed is:

1. A virtual image display device comprising:
an image projection unit that selectively projects a first projection light linearly polarized in a first direction and a second projection light linearly polarized in a second direction orthogonal to the first direction to a windshield and that presents to a user a virtual image based on the first projection light or the second projection light reflected by the windshield;
a reflected light measurement unit that measures an intensity of light incident from the windshield into the image projection unit along a light path in which the first projection light and the second projection light are projected;
a determination unit that determines whether the user is wearing polarized sunglasses that shield a component linearly polarized in the first direction, based on a first light intensity measured by the reflected light measurement unit when the first projection light is projected, a second light intensity measured by the reflected light measurement unit when the second projection light is projected, and a background light intensity measured by the reflected light measurement unit in a non-display period in which neither the first projection light nor the second projection light is projected; and
a display control unit that causes the image projection unit to project the first projection light when the determination unit determines that polarized sunglasses are not being worn and causes the image projection unit to project the second projection light when the determination unit determines that polarized sunglasses are being worn.

2. The virtual image display device according to claim 1, wherein
the virtual image display device is mounted on a vehicle, the first direction is a direction orthogonal to both the light path and a vertical direction of the vehicle, the second direction is a direction orthogonal to both the light path and the first direction, and the user is a driver of the vehicle.

3. The virtual image display device according to claim 1, wherein the image projection unit includes a first light source that generates a first laser light linearly polarized in the first direction, a second light source that generates a second laser light linearly polarized in the second direction, and a scan unit that generates the first projection light by scanning the first laser light in a raster scan pattern and generates the second projection light by scanning the second laser light in a raster scan pattern, and the determination unit determines whether polarized sunglasses are being worn based on a time-integrated value of the first light intensity measured by the reflected light measurement unit over a raster scan period in which the first projection light is generated and a time-integrated value of the second light intensity measured by the reflected light measurement unit over a raster scan period in which the second projection light is generated.

4. The virtual image display unit according to claim 1, wherein the image projection unit is adapted to project, as the first projection light, a first illumination light linearly polarized in the first direction and a first display light for presenting a display image linearly polarized in the first direction, the image projection unit is adapted to project, as the second projection light, a second illumination light linearly polarized in the second direction and a second display light for presenting the display image linearly polarized in the second direction, the display control unit switches between a first period in which the first illumination light is projected, a second period in which the second illumination light is projected, and a third period in which the first display light or the second display light is projected, the determination unit determines whether polarized sunglasses are being worn based on the first light intensity measured by the reflected light measurement unit in the first period and the second light intensity measured by the reflected light measurement unit in the second period, and the display control unit causes the image projection unit to project the first display light in the third period when the determination unit determines that polarized sunglasses are not being worn and causes the image projection unit to project the second display light in the third period when the determination unit determines that polarized sunglasses are being worn.

5. The virtual image display device according to claim 4, wherein the display control unit periodically switches between the first period, the second period, and the third period, and the determination unit determines whether polarized sunglasses are being worn based on a plurality of first light intensities measured by the reflected light measurement unit in a plurality of first periods and on a plurality of second light intensities measured by the reflected light measurement unit in a plurality of second periods.

6. The virtual image display device according to claim 1, wherein the determination unit determines whether polarized sunglasses are being worn based further on a first reflectance of the first projection light on the windshield and a second reflectance of the second projection light on the windshield.

7. The virtual image display device according to claim 1, wherein the reflected light measurement unit includes an imaging element that takes an image based on an intensity of light incident from the windshield toward the image projection unit along the light path, the reflected light measurement unit being configured to take a first measurement image corresponding to the first light intensity when the first projection light is projected and take a second measurement image corresponding to the second light intensity when the second projection light is projected, and the determination unit determines whether the user is wearing polarized sunglasses that shield the component linearly polarized in the first direction, based on the first measurement image and the second measurement image.

* * * * *